US012752588B2

(12) United States Patent
Akiki et al.

(10) Patent No.: US 12,752,588 B2
(45) Date of Patent: Oct. 6, 2026

(54) THERMAL MANAGEMENT SYSTEM FOR A HYBRID OR ELECTRIC VEHICLE

(71) Applicant: VALEO SYSTEMES THERMIQUES, La Verriere (FR)

(72) Inventors: Roland Akiki, La Verriere (FR); Rody El Chammas, La Verriere (FR); Muriel Porto, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 105 days.

(21) Appl. No.: 18/705,132

(22) PCT Filed: Oct. 11, 2022

(86) PCT No.: PCT/EP2022/078296
§ 371 (c)(1),
(2) Date: Apr. 26, 2024

(87) PCT Pub. No.: WO2023/072587
PCT Pub. Date: May 4, 2023

(65) Prior Publication Data

US 2024/0424856 A1 Dec. 26, 2024

(30) Foreign Application Priority Data

Oct. 26, 2021 (FR) ....................................... 2111333

(51) Int. Cl.
*B60H 1/00* (2006.01)
*B60H 1/03* (2006.01)

(52) U.S. Cl.
CPC ....... *B60H 1/00278* (2013.01); *B60H 1/0005* (2013.01); *B60H 1/00342* (2013.01);
(Continued)

(58) Field of Classification Search
CPC .............. B60H 1/00278; B60H 1/0005; B60H 1/00342; B60H 1/00385; B60H 1/00885;
(Continued)

(56) References Cited

U.S. PATENT DOCUMENTS 1,479,079 A 1/1924 Kutchera
4,383,576 A * 5/1983 Bricard ................ F28D 20/025 165/104.17
(Continued)

FOREIGN PATENT DOCUMENTS

CN 108482067 A 9/2018
CN 109312965 A * 2/2019 ......... B60H 1/32281
(Continued)

OTHER PUBLICATIONS

European Patent Office, International Search Report (with English translation) and Written Opinion of corresponding International Application No. PCT/EP2022/078296, dated Feb. 20, 2023.
(Continued)

*Primary Examiner* — Emmanuel E Duke
(74) *Attorney, Agent, or Firm* — Osha Bergman Watanabe & Burton LLP

(57) ABSTRACT

The invention relates to a thermal management system for a hybrid or electric vehicle, including an air conditioning circuit including a two-fluid heat exchanger arranged jointly on a heat transfer fluid circuit, the heat transfer fluid circuit including: a first branch including a first pump, a heat transfer fluid heating device and the two-fluid heat exchanger, a second branch connected directly to the first branch. The heat transfer fluid circuit is configured such that, in a mode of heating the internal air flow, all of the heat transfer fluid passing through the heating device then passes through the two-fluid heat exchanger before returning to the first pump via the second branch.

18 Claims, 12 Drawing Sheets

(52) U.S. Cl.
CPC ......... *B60H 1/00385* (2013.01); *B60H 1/034* (2013.01); *B60H 2001/00307* (2013.01)

(58) Field of Classification Search
CPC ............ B60H 1/00921; B60H 1/32281; B60H 2001/00307; B60H 2001/00949; B60H 2001/3288
See application file for complete search history.

(56) References Cited

U.S. PATENT DOCUMENTS

| | | | | |
|---|---|---|---|---|
| 10,875,385 | B2 | 12/2020 | Durrani et al. | |
| 11,370,325 | B2 | 6/2022 | Durrani | |
| 11,446,978 | B2 | 9/2022 | Bara et al. | |
| 2020/0220236 | A1* | 7/2020 | Durrani | H01M 10/667 |
| 2021/0301588 | A1* | 9/2021 | Molbo | E06B 3/6775 |

FOREIGN PATENT DOCUMENTS

| | | | | | |
|---|---|---|---|---|---|
| CN | 113454407 | A | * | 9/2021 | F25B 40/02 |
| DE | 102020100428 | A1 | | 8/2020 | |
| FR | 2462683 | A1 | * | 2/1981 | F28D 20/025 |
| FR | 3097472 | A1 | * | 12/2020 | H01M 10/6561 |
| FR | 3101282 | A1 | * | 4/2021 | F25B 25/005 |
| FR | 3111297 | A1 | * | 12/2021 | H01M 10/663 |
| JP | 2021020596 | A | | 2/2021 | |

OTHER PUBLICATIONS

European Office Action issued in corresponding EP Application No. 22800682.1, dated Nov. 12, 2025. (7 pages).

* cited by examiner

THERMAL MANAGEMENT SYSTEM FOR A HYBRID OR ELECTRIC VEHICLE

TECHNICAL FIELD

The invention relates to the field of motor vehicles and more particularly to a thermal management circuit for a hybrid or electric motor vehicle.

BACKGROUND OF THE INVENTION

In electric and hybrid vehicles, the thermal management of the passenger compartment is generally performed by a reversible air conditioning circuit. Reversible is given to mean that this air conditioning circuit can operate in a cooling mode in order to cool the air sent to the passenger compartment and in a heat pump mode in order to heat the air sent to the passenger compartment. This reversible air conditioning circuit can also include a spur in order to manage the temperature of the batteries of the electric or hybrid vehicle. It is thus possible to heat or cool the batteries using the reversible air conditioning loop. In heat pump mode, heat energy is taken from the outside air and transmitted to an internal air flow which is blown into the passenger compartment to heat the latter.

However, when the outside temperature is very low, it is not possible to use the air conditioning circuit in this heat pump mode.

It is therefore known practice to arrange in the internal air flow an electric heating device which directly heats the air flow. However, such a heating device consumes a lot of energy. In addition, this requires that an additional component be arranged in the air flow, which is expensive and takes up space in the vehicle.

One of the aims of the present invention is therefore to overcome at least some of the drawbacks of the prior art and propose an improved thermal management circuit.

SUMMARY OF THE INVENTION

The invention proposes a thermal management system for a hybrid or electric vehicle, the thermal management system comprising a first reversible air conditioning circuit in which a refrigerant circulates and comprising a two-fluid heat exchanger arranged jointly on a second heat transfer fluid circuit, the air conditioning circuit comprising a condenser for transmitting heat energy to an internal air flow, the heat transfer fluid circuit comprising:

- a first branch comprising, in the direction of circulation of the heat transfer fluid, a first pump, a heat transfer fluid heating device, and the two-fluid heat exchanger,
- a second branch, an upstream end of which is connected directly to the first branch downstream of the two-fluid heat exchanger and a downstream end of which is connected directly to the first branch upstream of the first pump, characterized in that the heat transfer fluid circuit is configured such that, in a first mode of heating the internal air flow, all of the heat transfer fluid passing through the heating device then passes through the two-fluid heat exchanger before returning to the first pump via the second branch, the heating device and the two-fluid heat exchanger being active.

According to another aspect of the invention, in the first branch, the two-fluid heat exchanger is arranged directly downstream of the heat transfer fluid heating device.

According to another aspect of the invention, apart from the first pump, the heat transfer fluid heating device and the two-fluid heat exchanger, the first branch does not include any other device capable of substantially modifying the amount of heat accumulated by the heat transfer fluid.

According to another aspect of the invention, the second branch does not include any device capable of substantially modifying the amount of heat accumulated by the heat transfer fluid.

According to another aspect of the invention, the second branch comprises a heat transfer fluid expansion vessel.

According to another aspect of the invention, the heat transfer fluid circuit comprises a third branch which is connected to the first branch in parallel with the first pump and with the heating device, and which comprises, in the direction of circulation of the heat transfer fluid, a second pump and an "electric machines" heat exchanger, which allows the exchange of heat between power electronics and/or an electric motor of the vehicle and the heat transfer fluid, an upstream end of the third branch being connected to the second branch and a downstream end of the third branch being connected to the first branch upstream of the two-fluid heat exchanger.

According to another aspect of the invention, the heat transfer fluid circuit is configured to operate in a second mode of heating the internal air flow, in which all of the heat transfer fluid passing through the second branch circulates in a closed loop through the second pump, through the "electric machines" heat exchanger then through the two-fluid heat exchanger before returning to the second pump via the second branch, the two-fluid heat exchanger being active.

According to another aspect of the invention, the heat transfer fluid circuit is configured to operate in a third mode of heating the internal air flow, in which all of the heat transfer fluid passing through the two-fluid heat exchanger, in the active state, passes through the second branch and is then split into two flows circulating simultaneously:

- through the first pump, through the electric heating device and through the two-fluid heat exchanger before returning to the two-fluid heat exchanger;
- through the second pump, through the "electric machines" heat exchanger and through the two-fluid heat exchanger before returning to the two-fluid heat exchanger.

According to another aspect of the invention, the heat transfer fluid circuit comprises a fourth branch equipped with a "batteries" heat exchanger, which is configured to allow the exchange of heat between batteries of the vehicle and the heat transfer fluid, the fourth branch comprising an upstream end which is connected to the first branch downstream of the two-fluid heat exchanger and a downstream end which is connected to the second branch.

According to another aspect of the invention, the heat transfer fluid circuit is configured to operate in a fourth mode of heating the internal air flow, in which all of the heat transfer fluid passing through the second branch circulates in a closed loop through the first pump, through the electric heating device, through the two-fluid heat exchanger and through the "batteries" heat exchanger before returning to the first pump via the second branch, the two-fluid heat exchanger being active.

According to another aspect of the invention, the heat transfer fluid circuit comprises a fifth branch equipped with a radiator arranged in an external air flow, the fifth branch being connected to the first branch in parallel with the second branch.

According to another aspect of the invention, the fifth branch comprises an upstream end which is connected to the fourth branch downstream of the "batteries" heat exchanger and a downstream end which is connected to the first branch upstream of the first pump.

According to another aspect of the invention, the downstream end of the fifth branch is connected to the third branch upstream of the second pump.

According to another aspect of the invention, the heat transfer fluid circuit comprises a sixth branch which comprises an upstream end which is connected to the third branch downstream of the "electric machines" heat exchanger and a downstream end which is connected to the fifth branch upstream of the first radiator.

According to another aspect of the invention, the heat transfer fluid circuit comprises a device for redirecting the heat transfer fluid which comprises only three three-way valves:

- a first three-way valve being arranged at a connection point connecting the first branch with the second branch and with the fourth branch;
- a second three-way valve being arranged at a connection point connecting the third branch with the sixth branch;
- a third three-way valve being arranged at a connection point connecting the fifth branch with the fourth branch.

According to another aspect of the invention, in each of the heating modes, the two-fluid heat exchanger fulfils, in the air conditioning circuit, the function of evaporator of the refrigerant.

The invention also relates to a method of operating the system produced according to the teachings of the invention, characterized in that, in a first mode of heating the internal air flow, all of the heat transfer fluid passing through the heating device then passes through the two-fluid heat exchanger before returning to the first pump via the second branch, the heating device and the two-fluid heat exchanger being active.

BRIEF DESCRIPTION OF DRAWINGS

Further features and advantages of the invention will become apparent from reading the following detailed description, for an understanding of which reference will be made to the appended drawings described succinctly below, where.

DETAILED DESCRIPTION OF THE INVENTION

Figure 1:
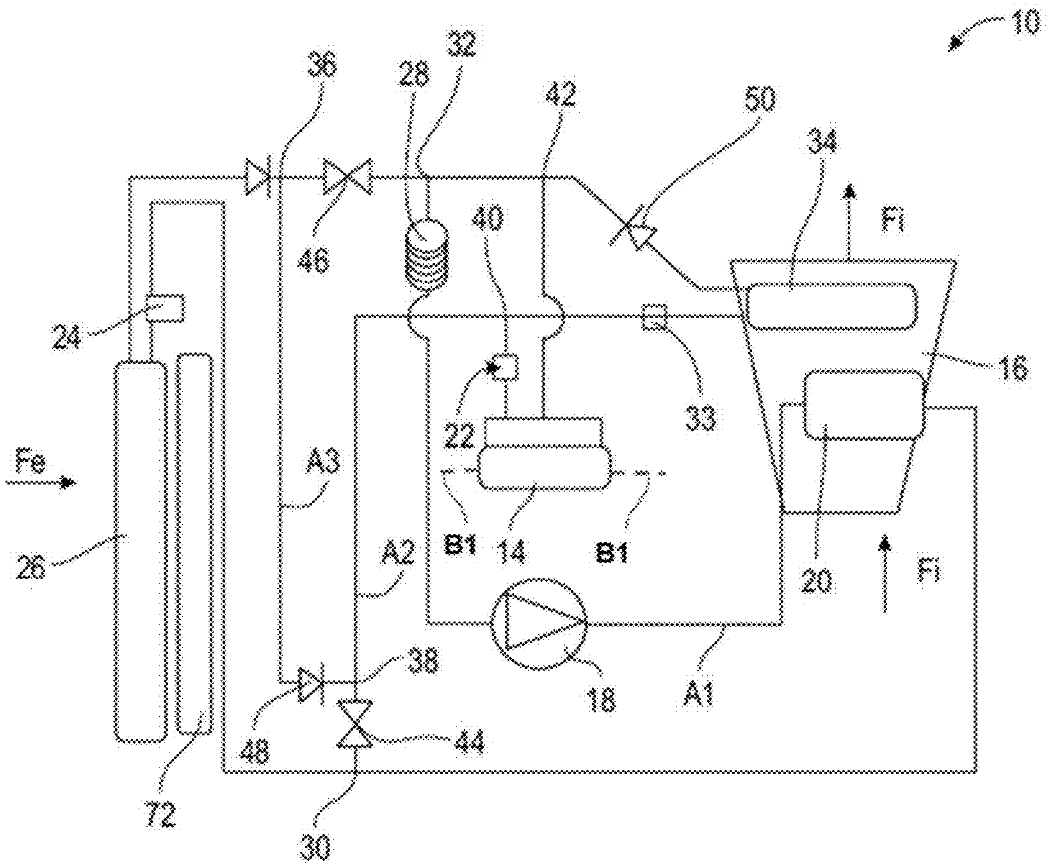
FIG. 1 is a schematic view which shows an air conditioning circuit fitted in the thermal management system produced according to the teachings of the invention.

In the rest of the description, elements having an identical structure or similar functions will be denoted by the same reference.

In the following description, the expression "a first element upstream of a second element" means that the first element is placed before the second element with respect to the direction of circulation, or travel, of a fluid. Similarly, the expression "a first element downstream of a second element" means that the first element is placed after the second element with respect to the direction of circulation, or travel, of the fluid concerned.

The term "branch" here refers to a portion of a circuit open at its two ends comprising only elements arranged in series.

In the drawings, the pipes in which the heat transfer fluid is moving will be depicted in bold lines and the pipes in which the heat transfer fluid is not moving will be depicted in thinner lines.

As shown in the various figures, the invention relates to a thermal conditioning system. This is, for example, a thermal management system for a motor vehicle. In this case it is an electric or hybrid motor vehicle which includes an electric motor which provides engine torque to the drive wheels of the vehicle. The electric motor is supplied with electric current at least by batteries, referred to as traction batteries. During the operation of the vehicle, the electric motor and the battery are liable to produce heat.

Figure 2:
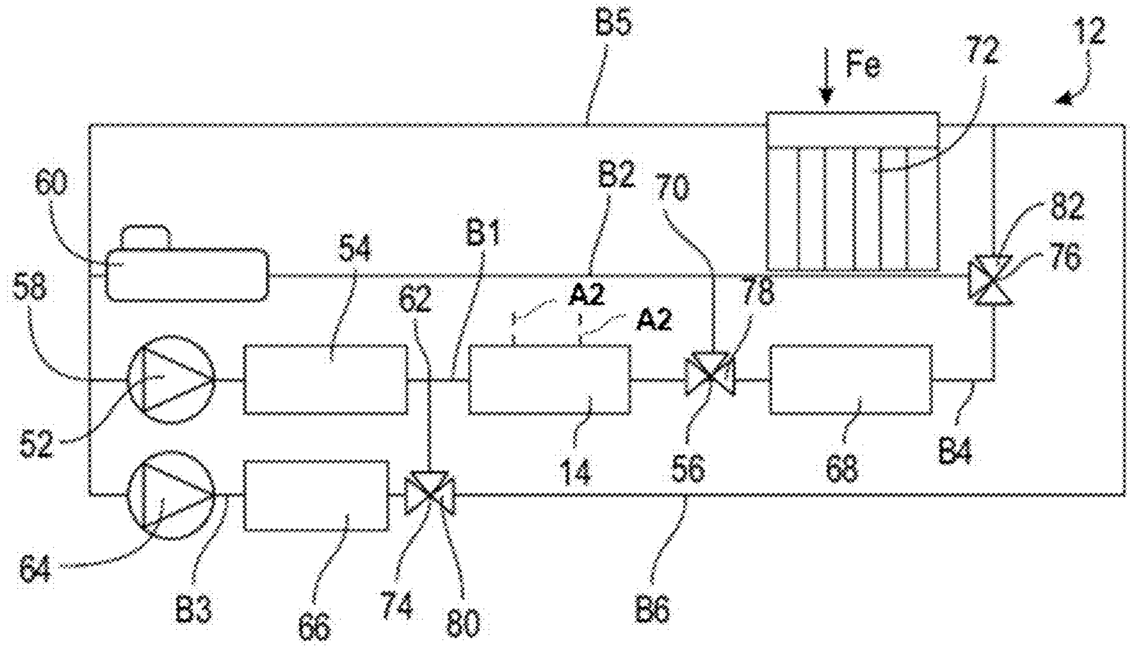
FIG. 2 is a schematic view which shows a heat transfer fluid circuit fitted in the thermal management system produced according to the teachings of the invention and intended to operate in collaboration with the air conditioning circuit of FIG. 1.

As shown more particularly in FIG. 1, said system comprises a first air conditioning circuit 10 in which a refrigerant circulates, as shown in FIG. 1, and a second heat transfer fluid circuit 12 in which a heat transfer fluid circulates, as shown in FIG. 2.

The heat transfer fluid is, for example, a heat transfer liquid such as water comprising an anti-freeze, in particular glycol water. The refrigerant is for example a hydrofluorocarbon, such as R-134a.

The air conditioning circuit 10 comprises a two-fluid heat exchanger 14 arranged jointly on the second heat transfer fluid circulation circuit 12. The two-fluid heat exchanger 14 is configured to allow heat exchange between the refrigerant, circulating in the air conditioning circuit 10, and the heat transfer fluid, circulating in the heat transfer fluid circuit 12, without mixing between the heat transfer fluid and the refrigerant.

The air conditioning circuit 10 is configured to allow, in a heat pump mode, heating of an air flow, depicted by an arrow referenced Fi, by means of compression and expansion of the refrigerant.

The air flow Fi is, for example, an internal air flow Fi, intended to be sent into the passenger compartment of the vehicle to heat it. The system thus makes it possible to heat the passenger compartment of the vehicle using heat energy taken from the first heat transfer fluid.

The internal air flow circulates, for example, in a heating, ventilation and/or air conditioning installation 16 of the passenger compartment.

The air conditioning circuit 10 in this case comprises for this purpose a main loop through which the refrigerant passes and which comprises in the following order, in the direction of flow of the refrigerant, a compressor 18, a condenser 20, a first expansion device 22, configured to exchange heat with the internal air flow Fi, and the first two-fluid exchanger 14. The condenser 20 makes it possible to transmit heat energy to the internal air flow Fi.

The condenser 20 is in this case arranged in the heating, ventilation and/or air conditioning device 16 to allow the heat exchange between the refrigerant and the internal air flow Fi. The condenser 20 is in particular arranged directly in the internal air flow.

In a variant of the invention that has not been shown, the condenser 20 makes it possible to exchange heat with the internal air flow via the heat transfer fluid circuit 12. In this case, the condenser 20 transmits heat energy to the heat transfer fluid via a heat exchanger, then the heat transfer fluid transmits said heat energy to the internal air flow via a heat exchanger, referred to as a "heater core", arranged directly in the internal air flow.

The refrigerant is in the high pressure gaseous state leaving the compressor 18. It then undergoes condensation while passing through the condenser 20, thereby giving up heat energy to the internal air flow Fi, and goes into the liquid state. It then undergoes expansion in the first expansion device 22 and passes through the first two-fluid exchanger 14 where it evaporates, absorbing heat energy from the heat transfer fluid.

By recovering heat energy from the second heat transfer fluid circuit 12, it is possible to heat the internal air flow Fi by means of the condenser 20 even when the outside temperature is too low for the first air conditioning circuit 10 to be able to operate in external heat pump mode by heat exchange with the outside air. This makes it possible in particular to avoid having to equip the heating, ventilation and/or air conditioning device 16 with an electric air heating device.

The air conditioning circuit 10 is in this case reversible. This means that it is also capable of operating in a mode of cooling the internal air flow Fi.

By way of non-limiting example, the air conditioning circuit 10 shown in FIG. 1 more particularly comprises a first circulation pipe A1 comprising, in the direction of circulation of the refrigerant, the compressor 18, the condenser 20 arranged in the internal air flow Fi, a second expansion device 24, and an evaporator-condenser 26 arranged in an external air flow Fe. The evaporator-condenser 26 is thus generally arranged on the front face of the motor vehicle. A flap (not shown) can also be installed in the heating, ventilation and/or air conditioning device 16 in order to prevent the internal air flow from passing through the condenser 20 or to allow it to do so. The first circulation pipe A1 can also comprise an accumulator 28 allowing a phase separation of the refrigerant and arranged upstream of the compressor 18, between the evaporator-condenser 26 and said compressor 18.

The air conditioning circuit 10 also includes a second circulation pipe A2 connected in parallel with the evaporator-condenser 26. This second circulation pipe A2 connects more particularly:

- a first junction point 30 arranged downstream of the condenser 20, between said condenser 20 and the second expansion device 24, and
- a second junction point 32 arranged downstream of the evaporator-condenser 26, between said evaporator-condenser 26 and the compressor 18, more specifically upstream of the accumulator 28.

This second circulation pipe A2 includes in particular a third expansion device 33 and an evaporator 34 arranged in the internal air flow Fi.

The air conditioning circuit 10 further includes a third circulation pipe A3 connecting the outlet of the evaporator-condenser 26 and the inlet of the third expansion device 33. This third circulation pipe A3 connects more particularly:

- a third junction point 36 arranged downstream of the evaporator-condenser 26, between said evaporator-condenser 26 and the compressor 18, more specifically upstream of the accumulator 28, and
- a fourth junction point 38 arranged on the second circulation pipe A2 upstream of the third expansion device 33, between the first junction point 30 and the third expansion device 33.

The air conditioning circuit 10 also includes a fourth circulation pipe A4 connecting the inlet of the third expansion device 33 and the inlet of the compressor 18. This fourth circulation pipe A4 specifically connects:

- a fifth junction point 40 arranged on the second circulation pipe A2 upstream of the third expansion device 33, between the fourth junction point 38 of the third circulation pipe A3 and said third expansion device 33, and
- a sixth junction point 42 arranged upstream of the compressor 18, between the evaporator 34 and the second junction point 32 of the second circulation pipe A2, more specifically upstream of the accumulator 28.

The fourth circulation pipe A4 includes in particular the first expansion device 22 and the two-fluid heat exchanger 14. The first expansion device 22 is arranged upstream of the two-fluid heat exchanger 14, between the fifth junction point 40 and said two-fluid heat exchanger 14.

The air conditioning circuit 10 also includes a device for redirecting the refrigerant in order to define the circulation pipe through which it circulates. In the example illustrated in FIG. 1, this refrigerant redirection device includes in particular:

- a first shut-off valve 44 arranged on the second circulation pipe A2 between the first junction point 30 and the fourth junction point 38,
- a second shut-off valve 46 arranged on the first circulation pipe A1 between the third junction point 36 and the second junction point 32,
- a non-return valve 48 arranged on the third circulation pipe A3, arranged such that it prevents the circulation of refrigerant from the fourth junction point 38 towards the third junction point 36,
- a non-return valve 50 arranged on the second circulation pipe A2, arranged such that it prevents the circulation of refrigerant from the sixth junction point 42 towards the evaporator 34.

The first 22, second 24 and third 33 expansion devices include a shut-off function that makes it possible to prevent the refrigerant from passing through them when it is activated.

It is however entirely possible to envisage other means in order to define the circulation pipe through which the refrigerant circulates, such as for example three-way valves arranged strategically on junction points.

When the air conditioning circuit 10 is operating in internal heat pump mode, the shut-off valves are controlled such that the refrigerant circulates only through the main loop. The two-fluid heat exchanger 14 then fulfils the function of evaporator of the refrigerant, while the refrigerant is not circulating through the evaporator-condenser 26, such that only the heat energy from the heat transfer fluid in the heat transfer fluid circuit 12 is used to heat the internal air flow Fi. In this internal heat pump operating mode, the two-fluid heat exchanger 14 is active with a refrigerant evaporator function.

The heat transfer fluid circuit 12 is now described with reference to FIG. 2.

The heat transfer fluid circuit 12 comprises a first branch B1 comprising, in the direction of circulation of the heat transfer fluid, a first pump 52, a heat transfer fluid heating device 54, and said two-fluid heat exchanger 14.

The heat transfer fluid heating device 54 is in this case an electric heating device, which heats the heat transfer fluid by means of electrical resistors for example.

The heat transfer fluid circuit 12 also includes a second branch B2, an upstream end of which is connected directly to the first branch B1 at a first connection point 56 downstream of the two-fluid heat exchanger 14. A downstream end of the second branch B2 is connected directly to the first branch B1 at a second connection point 58 arranged upstream of the first pump 52.

Apart from the first pump 52, the heat transfer fluid heating device 54 and the two-fluid heat exchanger 14, the first branch B1 does not include any other device capable of substantially modifying the amount of heat accumulated by the heat transfer fluid. The first branch B1 notably does not include any other heat exchanger. More particularly, the two-fluid heat exchanger 14 is arranged directly downstream of the heat transfer fluid heating device 54 without the interposition of any other device.

Likewise, the second branch B2 does not include any device capable of substantially modifying the amount of heat accumulated by the heat transfer fluid. The second branch B2 notably does not include any heat exchanger. More particularly, the second branch B2 in this case only comprises a heat transfer fluid expansion vessel 60.

In a variant of the invention that has not been shown, the second branch B2 does not comprise an expansion vessel.

Figure 12:
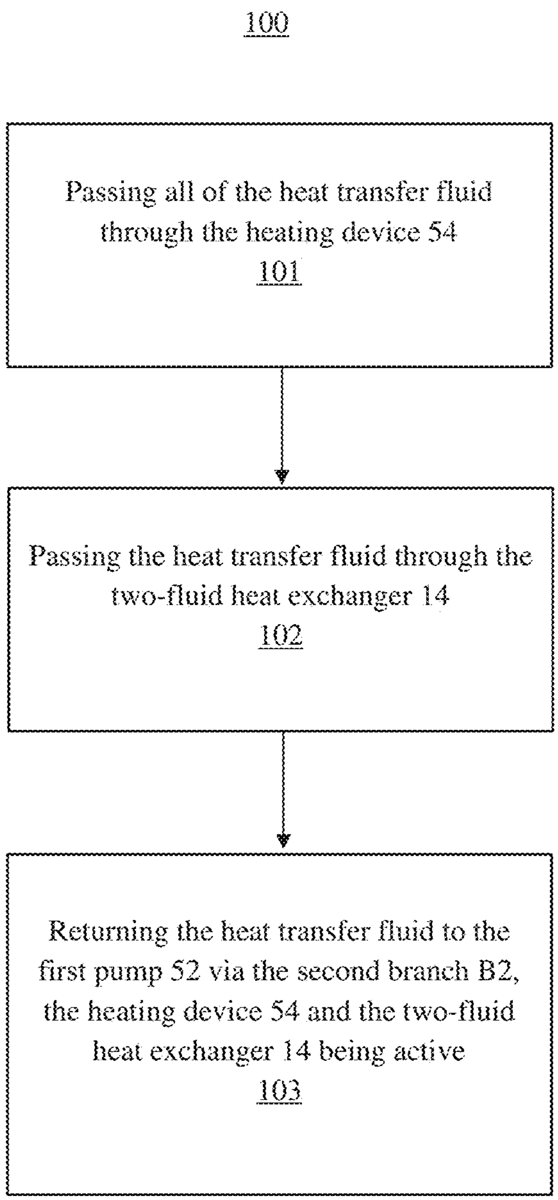
FIG. 12 shows a method according to the invention.

FIG. 12 shows a method 100 according to the invention. The heat transfer fluid circuit 12 is configured such that, in a first mode of heating the internal air flow Fi, all of the heat transfer fluid passing through the heating device 54 then passes through the two-fluid heat exchanger 14 before returning to the first pump 52 via the second branch. In other words, the method 100 includes passing 101 all of the heat transfer fluid through the heating device 54, then passing 102 the heat transfer fluid through the two-fluid heat exchanger 14, and subsequently returning 103 the heat transfer fluid to the first pump 52 via the second branch B2, the heating device 54 and the two-fluid heat exchanger 14 being active. In this operating mode, the heating device 54 is active and the two-fluid heat exchanger 14 is active with a refrigerant evaporator function. This operating mode is shown in particular in FIG. 3 in which the pipes in which the heat transfer fluid circulates are indicated in bold, the heat transfer fluid remaining substantially stationary in the other pipes. The direction of circulation of the heat transfer fluid is indicated by arrows.

The air conditioning circuit 10 operates at the same time in internal heat pump mode. Thus, the heating device 54 supplies heat energy to the heat transfer fluid circulated by the first pump 52. A part of this heat energy is transmitted to the refrigerant via the two-fluid heat exchanger 14, in such a way as to then heat the internal air flow Fi via the condenser 20. All of the heat transfer fluid in circulation then returns to the first pump 52 via the second branch B2 so as to be heated again by the heating device 54. Thus, the heat accumulated by the heat transfer fluid increases rapidly with each new cycle in a first loop formed by the first branch B1 and the second branch B2. This makes it possible to rapidly increase the temperature of the internal air flow Fi via the air conditioning circuit 10.

To allow rapid heating, the first loop formed only by the first branch B1 and the second branch B2 is advantageously very short. Advantageously, this loop includes only the first pump 52, the heating device 54, the two-fluid heat exchanger 14 and the expansion vessel 60, together with means for redirecting the heat transfer fluid only in this first loop.

The heat transfer fluid circuit 12 also includes a third branch B3 which is connected to the first branch B1 in parallel with the first pump 52 and with the heating device 54. The third branch B3 comprises an upstream end which is connected directly to the second branch B2 at the second connection point 58 and a downstream end which is connected directly to the first branch B1 at a third connection point 62 arranged upstream of the two-fluid heat exchanger 14. The third connection point 62 is more particularly arranged downstream of the heating device 54.

The third branch B3 comprises, in the direction of circulation of the heat transfer fluid, a second pump 64 and an "electric machines" heat exchanger 66. The "electric machines" heat exchanger 66 is configured to allow the exchange of heat between power electronics and/or the electric motor of the vehicle, on the one hand, and the heat transfer fluid on the other. The "electric machines" heat exchanger 66 makes it possible more particularly to cool the power electronics and/or the electric motor during their operation by transmitting the heat that they produce to the heat transfer fluid.

"Power electronics" means electronic devices other than the batteries and the electric motor.

In the embodiment shown in the figures, the "electric machines" heat exchanger exchanges heat with the electric motor.

Alternatively, the "electric machines" heat exchanger exchanges heat with the power electronics.

Apart from the second pump 64 and the "electric machines" heat exchanger 66, the third pump does not include any other device capable of substantially modifying the amount of heat accumulated by the heat transfer fluid. The third branch B3 notably does not include any heat exchanger.

Figure 4:
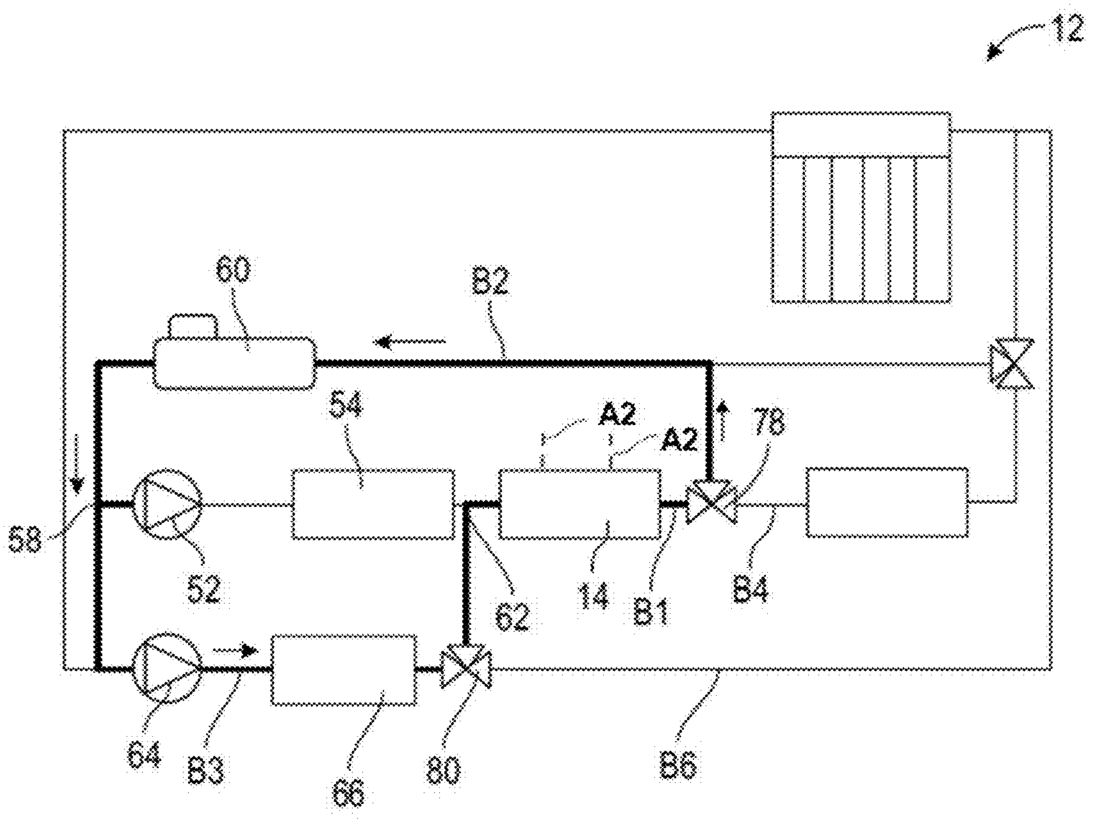
FIG. 4 is a view of the heat transfer fluid circuit of FIG. 2 operating in a second mode of heating an internal air flow.

As shown in FIG. 4, the heat transfer fluid circuit 12 is configured to operate in a second mode of heating the internal air flow Fi, in which all of the heat transfer fluid passing through the second branch B2 circulates in a closed loop through the second pump 64, through the "electric machines" heat exchanger 66 and through the two-fluid heat exchanger 14 before returning to the second pump 64 via the second branch B2, thus forming a second circulation loop.

In this operating mode, the air conditioning circuit 10 is operating in internal heat pump mode, the two-fluid heat exchanger 14 being active with a refrigerant evaporator function. Thus, the heat produced by the power electronics and/or the electric motor is used to heat the internal air flow Fi to heat the passenger compartment via the air conditioning circuit 10.

In this second heating mode, the heat transfer fluid circulates only through the second circulation loop. To this end, the first pump 52 is inactive to prevent the heat transfer fluid from circulating through the heating device 54, the heating device 54 then being inactive.

Figure 5:
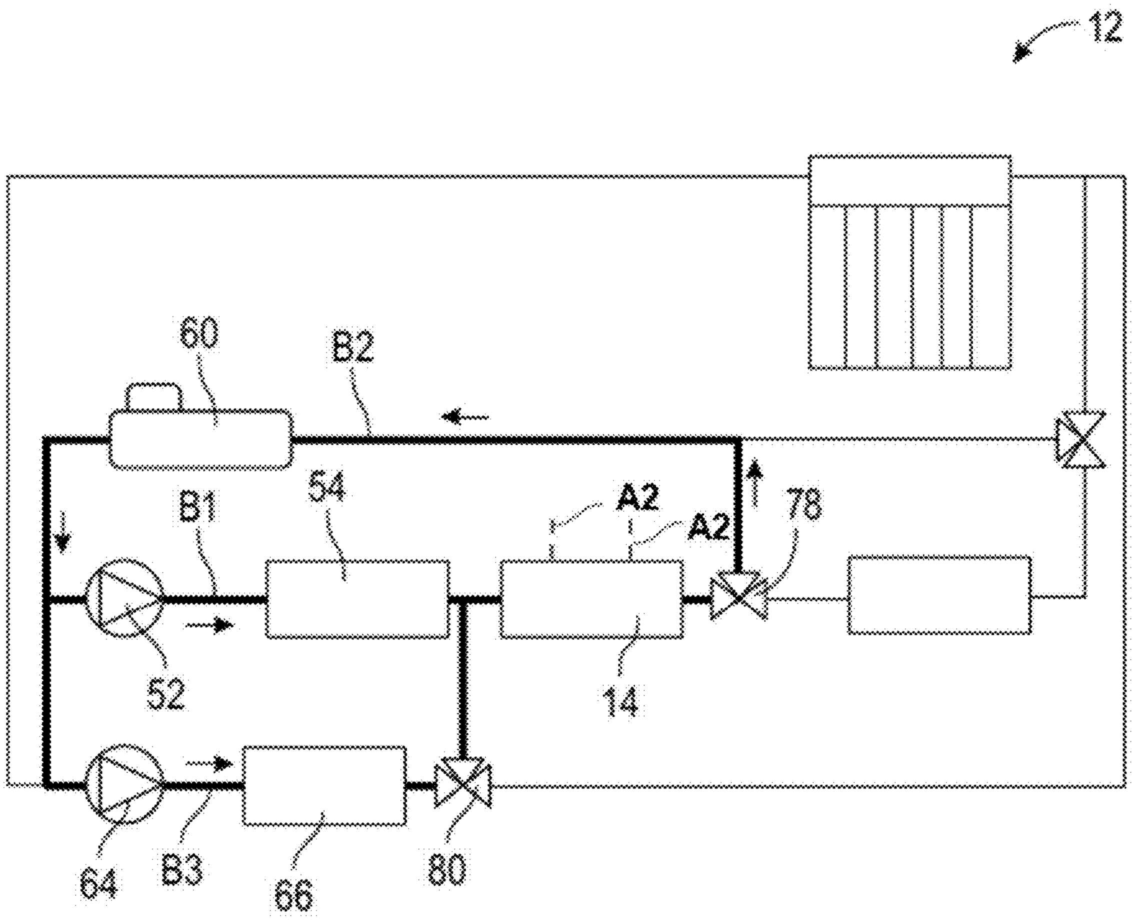
FIG. 5 is a view of the heat transfer fluid circuit of FIG. 2 operating in a third mode of heating an internal air flow.

As shown in FIG. 5, the heat transfer fluid circuit 12 is configured to operate in a third mode of heating the internal air flow, in which all of the heat transfer fluid passing through the second branch B2 is split only into two flows circulating simultaneously:

- through the first pump 52, through the electric heating device 54 and through the two-fluid exchanger 14 before returning to the second branch B2;
- through the second pump 64, through the "electric machines" heat exchanger 66 and through the two-fluid exchanger 14 before returning to the second branch B2.

In this operating mode, the air conditioning circuit 10 is operating in internal heat pump mode, the two-fluid heat exchanger 14 being active with a refrigerant evaporator function. Thus, the heat produced by the power electronics and/or the electric motor, on the one hand, and by the heating device 54 on the other hand, is used to heat the internal air flow Fi to heat the passenger compartment via the air conditioning circuit 10.

According to another aspect of the invention, the heat transfer fluid circuit 12 comprises a fourth branch B4 equipped with a "batteries" heat exchanger 68. The "batteries" heat exchanger 68 is configured to allow heat exchange between the traction batteries of the vehicle and the heat transfer fluid. The "batteries" heat exchanger 68 makes it possible more particularly to cool the batteries during their operation by transmitting the heat they produce to the heat transfer fluid, or to heat them when their temperature is too low. Batteries must be kept within an operating temperature range of, for example, 10° C. to 20° C.

The fourth branch B4 comprises an upstream end which is connected, in this case at the first connection point 56, to the first branch B1 downstream of the two-fluid exchanger 14. The fourth branch B4 also comprises a downstream end which is connected to the second branch B2 at a fourth connection point 70.

Figure 6:
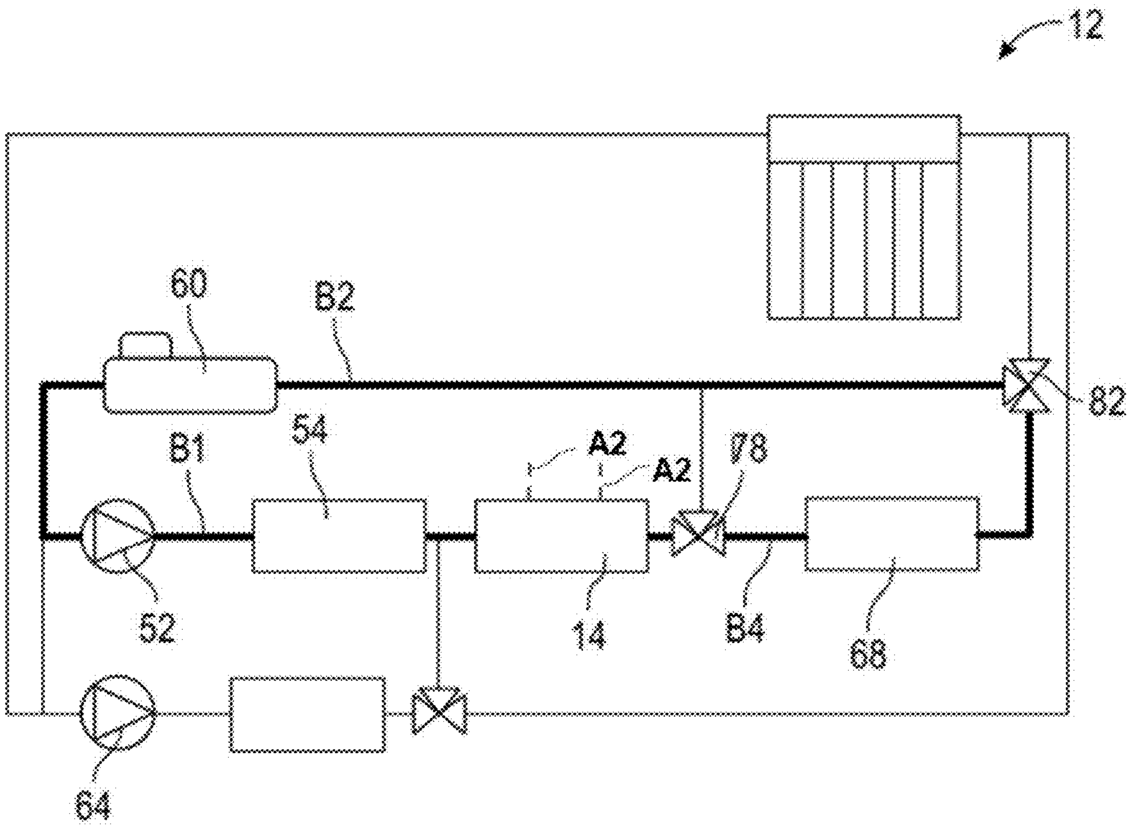
FIG. 6 is a view of the heat transfer fluid circuit of FIG. 2 operating in a fourth mode of heating an internal air flow.

As shown in FIG. 6, the heat transfer fluid circuit 12 is configured to operate in a fourth mode of heating the internal air flow Fi, in which all of the heat transfer fluid passing through the second branch B2 circulates in a closed loop through a third loop passing through the first pump 52, through the electric heating device 54, through the two-fluid exchanger 14 and through the "batteries" heat exchanger 68 before returning to the first pump 52 via the second branch B2.

In this operating mode, the heating device 54 can be active or inactive depending on the difference between the amount of heat dissipated by the battery and the need for heat in the passenger compartment. The air conditioning circuit 10 is operating in internal heat pump mode, the two-fluid heat exchanger 14 being active with a refrigerant evaporator function. Thus, the heat produced by the batteries is used to heat the internal air flow Fi to heat the passenger compartment via the air conditioning circuit 10.

This third loop is also used to allow other operating modes of the heat transfer fluid circuit 12. Thus, the heat transfer fluid circuit 12 can also operate in a mode of active cooling of the batteries. The heating device 54 is then inactive. In this operating mode, the heat produced by the batteries is then transmitted to the refrigerant via the two-fluid heat exchanger 14.

The third cooling loop can also be used for operation in a first battery heating mode. In this operating mode, the heating device 54 is active while the two-fluid heat exchanger 14 is inactive, or at least partially inactive, such that the heat energy supplied by the heating device 54 is transmitted only to the batteries via the "batteries" heat exchanger 68.

Referring again to FIG. 2, the heat transfer fluid circuit 12 further comprises a fifth branch B5 equipped with a radiator 72 arranged in the external air flow Fe. The fifth branch B5 is connected to the first branch B1 in parallel with the second branch B2. More particularly, the fifth branch B5 comprises an upstream end which is connected to the fourth branch B4 at a fifth connection point 74 arranged downstream of the "batteries" heat exchanger 68. The fifth branch B5 comprises a downstream end which is in this case connected to the first branch B1 upstream of the first pump 52, in this case at the second connection point 58. The downstream end of the fifth branch B5 is also connected to the third branch B3 upstream of the second pump 64 at a sixth connection point 76.

The heat transfer fluid circuit 12 comprises a sixth branch B6 which comprises an upstream end which is connected to the third branch B3 downstream of the "electric machines" heat exchanger 66 and a downstream end which is connected to the fifth branch B5 upstream of the radiator 72.

To make it possible to direct the heat transfer fluid during the various operating modes of the heat transfer fluid circuit 12, the latter includes a device for redirecting the heat transfer fluid. Advantageously, the heat transfer fluid circuit 12 described above is capable of operating in a large number of operating modes with a minimum of redirection components. The redirection device in this case comprises only three three-way valves:

- a first three-way valve 78 arranged at the first connection point 56 connecting the first branch B1 with the second branch B2 and with the fourth branch B4;
- a second three-way valve 80 arranged at the fifth connection point 74 connecting the third branch B3 with the sixth branch B6;
- a third three-way valve 82 arranged at the sixth connection point 76 connecting the fifth branch B5 with the fourth branch B4.

In addition, the operating state of the two pumps 52, 64 also participates in the redirection of the heat transfer fluid in the heat transfer fluid circuit 12.

The three-way valves 76, 78 and 80 have one inlet and two outlets. The outlets can be closed simultaneously or alternately to allow the heat transfer fluid to be directed in the right direction.

In the first mode of heating the internal air flow Fi, the first three-way valve 78 makes it possible to redirect the heat transfer fluid arriving from the first branch B1 only towards the second branch B2 to form the first loop. Moreover, the second pump 64 is inactive.

In the second mode of heating the internal air flow Fi, the first three-way valve 78 makes it possible to redirect the heat transfer fluid arriving from the first branch B1 only towards the second branch B2 and not towards the fourth branch B4. The second three-way valve 80 makes it possible to redirect the heat transfer fluid arriving from the third branch B3 only towards the first branch B1 and not towards the sixth branch B6. This makes it possible to obtain the second loop. Moreover, the first pump 52 is inactive.

In the third mode of heating the internal air flow Fi, the three-way valves 78 and 80 are controlled as in the second mode of heating the internal air flow Fi, but the first pump 52 and the second pump 64 are activated simultaneously.

To obtain the third loop shown in FIG. 6, the first three-way valve 78 makes it possible to redirect the heat transfer fluid arriving from the first branch B1 only towards the fourth branch B4 and not towards the second branch B2. The third three-way valve 82 makes it possible to redirect the heat transfer fluid arriving from the fourth branch B4 only towards the second branch B2 and not towards the fifth branch B5. Moreover, the second pump 64 is inactive.

The various operating modes of the heat transfer fluid circuit 12 are now described with reference to the following figures.

Figure 7:
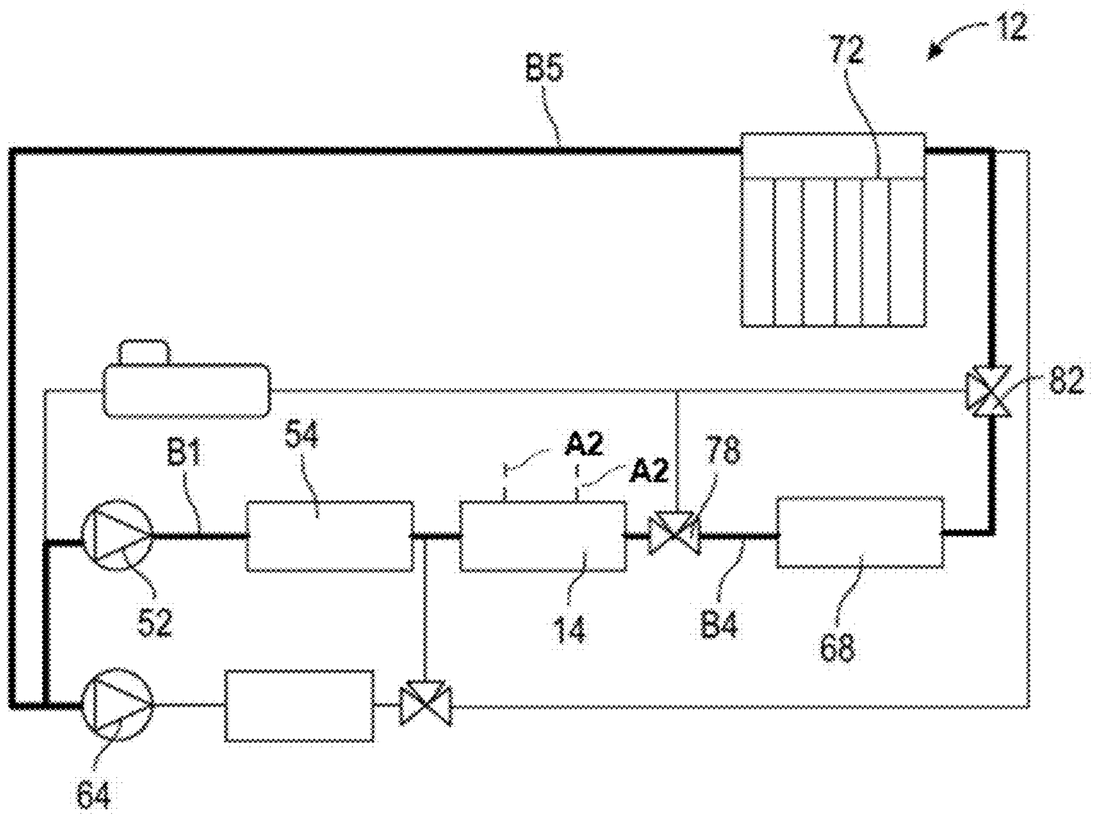
FIG. 7 is a view of the heat transfer fluid circuit of FIG. 2 operating in a mode of passive cooling of batteries of the vehicle.

As shown in FIG. 7, the heat transfer fluid circuit 12 can operate in a mode of passive cooling of the batteries in which the heat transfer fluid circulates in a fourth closed loop in which it passes successively through the first pump 52, the heating device 54, the two-fluid heat exchanger 14, the "batteries" heat exchanger 68 and the radiator 72 before returning to the first pump 52. In this operating mode, the heating device 54 and the two-fluid heat exchanger 14 are inactive. In this mode, the heat produced by the batteries is discharged by the radiator 72.

To obtain this fourth loop, the second pump 64 is inactive, the first three-way valve 78 is controlled to orient the heat transfer fluid from the first branch B1 towards the fourth branch B4.

Figure 8:
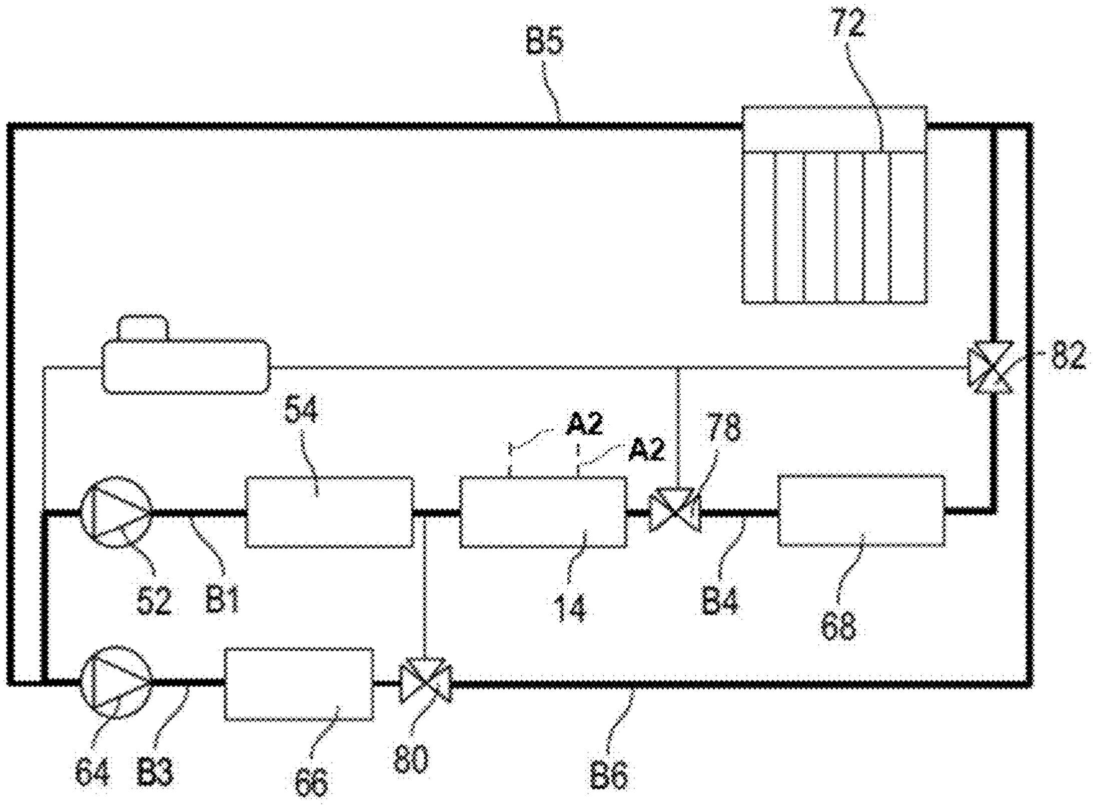
FIG. 8 is a view of the heat transfer fluid circuit of FIG. 2 operating in a mode of passive cooling of the batteries and of an electric motor and/or of the power electronics of the vehicle.

As shown in FIG. 8, the heat transfer fluid circuit 12 can operate in a mode of passive cooling of the batteries and/or the power electronics and/or the electric motor in which the heat transfer fluid circulating from the radiator 72 is split into two flows. A first flow passes through the first pump 52, through the heating device 54, through the two-fluid heat exchanger 14 and through the "batteries" heat exchanger 68 before returning to the radiator 72. A second flow passes through the second pump 64 and through the "electric machines" heat exchanger 66 before returning to the radiator 72 via the sixth branch B6. In this operating mode, the heat produced by the batteries and by the power electronics and/or the electric motor is discharged by means of the radiator 72.

To obtain this operating mode:

the two pumps 52, 64 operate simultaneously, the first three-way valve 78 is controlled to direct the heat transfer fluid from the first branch B1 towards the fourth branch B4, the second three-way valve 80 is controlled to direct the heat transfer fluid from the third branch B3 towards the sixth branch B6, the third three-way valve 82 is controlled to direct the heat transfer fluid from the fourth branch B4 and the sixth branch B6 towards the fifth branch B5.

Figure 9:
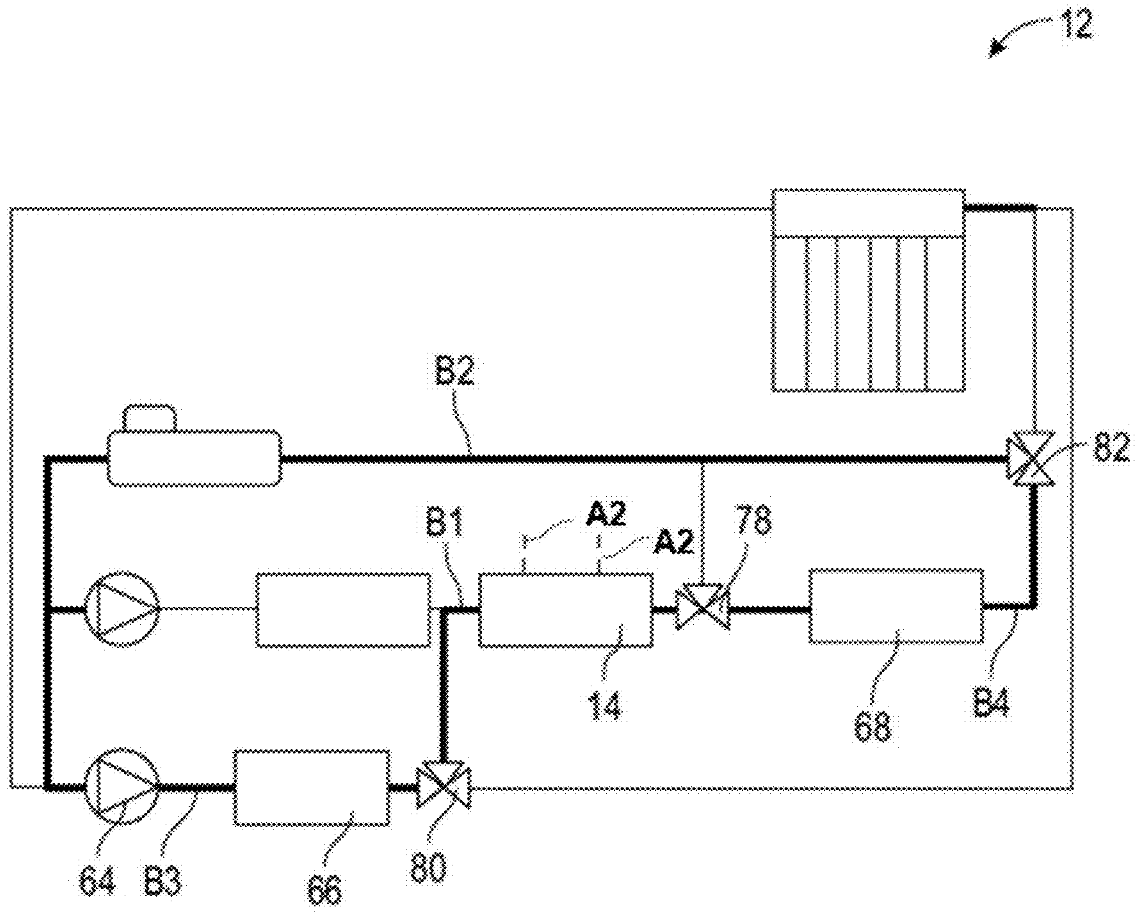
FIG. 9 is a view of the heat transfer fluid circuit of FIG. 2 operating in a mode of heating the batteries with or without heating of an internal air flow.

As shown in FIG. 9, the heat transfer fluid circuit 12 can operate in a second mode of heating the batteries in which the heat transfer fluid circulates in a fifth closed loop passing through the second pump 64, through the "electric machines" heat exchanger 66, through the two-fluid heat exchanger 14, through the "batteries" heat exchanger 68 before returning to the first pump 64 via the second branch B2.

To obtain this operating mode:

the first pump 52 is inactive whereas the second pump 64 is active, the first three-way valve 78 is controlled to direct the heat transfer fluid from the first branch B1 towards the fourth branch B4, the second three-way valve 80 is controlled to direct the heat transfer fluid from the third branch B3 towards the first branch B1, the third three-way valve 82 is controlled to direct the heat transfer fluid from the fourth branch B4 and the sixth branch B6 towards the second branch B2.

Figure 10:
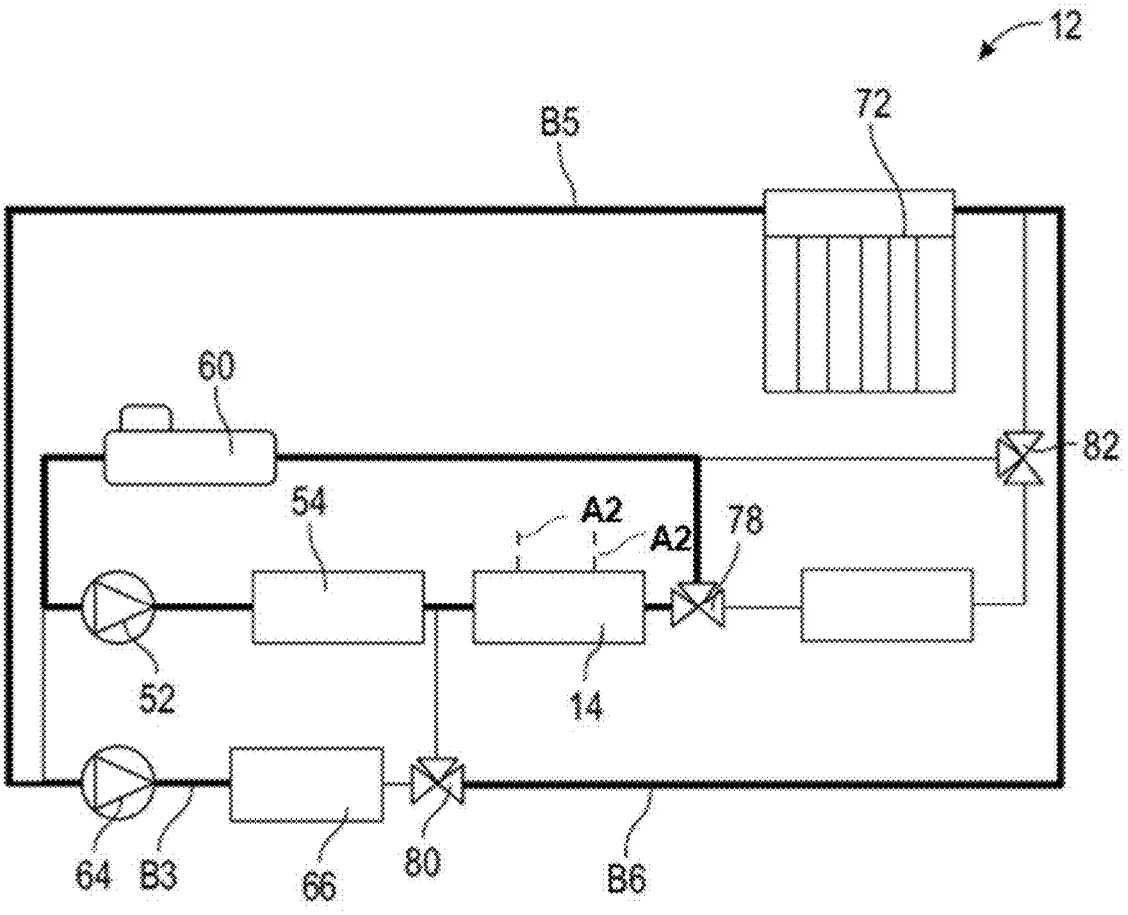
FIG. 10 is a view of the heat transfer fluid circuit of FIG. 2 operating simultaneously in the first mode of heating the internal air flow and in a mode of passive cooling of the power electronics and/or of the electric motor.
Figure 11:
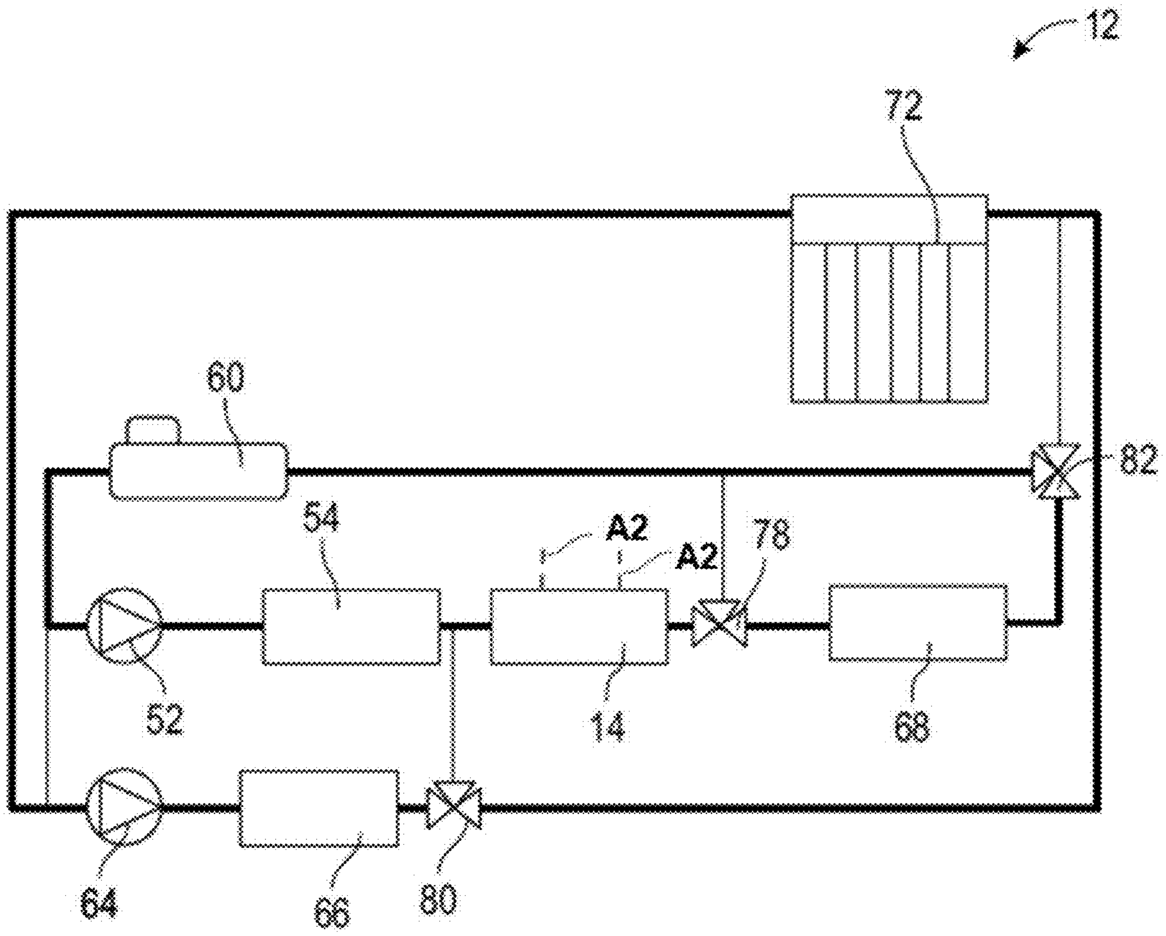
FIG. 11 is a view of the heat transfer fluid circuit of FIG. 2 operating simultaneously in the fourth mode of heating the internal air flow and/or the battery and in the mode of passive cooling of the power electronics and/or of the electric motor.

As shown in FIGS. 10 and 11, the heat transfer fluid circuit 12 can operate in a mode of passive cooling of the power electronics and/or the electric motor in which the heat transfer fluid follows a sixth closed loop. In this sixth loop, all of the heat transfer fluid circulating from the radiator 72 passes through the second pump 64 and through the "electric machines" heat exchanger 66 before returning to the radiator 72 via the sixth branch B6. In this operating mode, the heat produced by the power electronics and/or the electric motor is discharged by means of the radiator 72.

To obtain this operating mode:

the second pump 64 is activated, the second three-way valve 80 is controlled to direct the heat transfer fluid from the third branch B3 towards the sixth branch B6.

Figure 3:
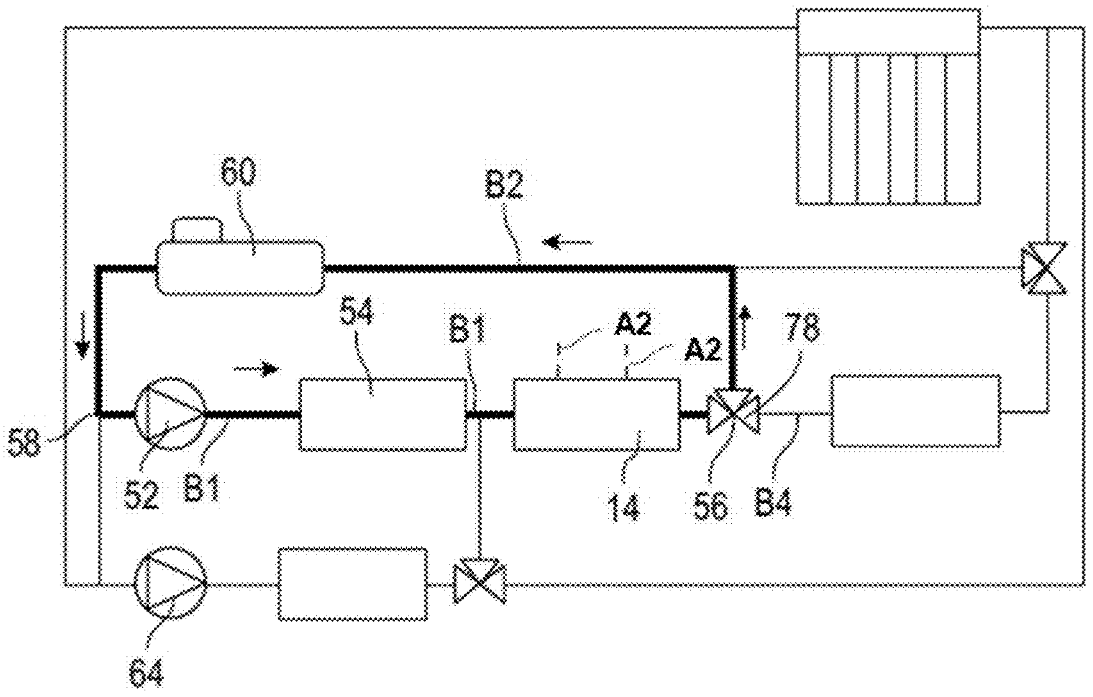
FIG. 3 is a view of the heat transfer fluid circuit of FIG. 2 operating in a first mode of heating an internal air flow.

As shown in FIGS. 10 and 11, this operating mode of passive cooling of the power electronics and/or the electric motor can be activated simultaneously with embodiments operating only with the first pump 52 and without the radiator 72, more particularly with operating modes using the first loop, shown in FIG. 3, or the third loop, shown in FIG. 6. To be specific, in these combinations of modes, the flow of fluid circulating in the sixth loop never mixes with the flow of fluid circulating in the first or in the third loop.

The invention thus makes it possible to rapidly heat the passenger compartment of the vehicle by recovering the heat from the heat transfer fluid in the heat transfer fluid circuit 12 via the air conditioning circuit 10. It is therefore no longer necessary to arrange an electric heating device directly in the internal air flow.

Furthermore, the invention makes it possible to use the heat produced by the power electronics and/or the electric motor and/or the batteries of the vehicle to heat the passenger compartment.

In addition, the heat transfer fluid circuit 12 thus configured makes it possible to perform numerous functions using a minimum of components, for example only three three-way valves.

What is claimed is:

1. A thermal management system for a hybrid or electric vehicle, the thermal management system comprising:

a reversible air conditioning circuit in which a refrigerant circulates, a heat transfer fluid circuit, and a two-fluid heat exchanger arranged jointly between the reversible air conditioning circuit and the heat transfer fluid circuit, with the reversible air conditioning circuit including a condenser for transmitting heat energy to an internal air flow, and the heat transfer fluid circuit including:

a first branch having two ends and including a first pump, a heat transfer fluid heating device and the two-fluid heat exchanger, a second branch with two ends connected respectively to the ends of the first branch so that the first branch and the second branch form a closed heat transfer fluid circuit, wherein the heat transfer fluid circuit is configured such that, in a first mode of heating the internal air flow, all of the heat transfer fluid passing through the heat transfer fluid heating device then passes through the two-fluid heat exchanger before returning to the first pump via the second branch, the heat transfer fluid heating device and the two-fluid heat exchanger being active, and wherein the heat transfer fluid circuit includes a fourth branch equipped with a battery heat exchanger, which is configured to allow the exchange of heat between batteries of the vehicle and the heat transfer fluid, the fourth branch including an upstream end connected to the first branch downstream of the two-fluid heat exchanger, and a downstream end connected to the second branch.

2. The thermal management system according to claim 1, wherein in the first branch, the two-fluid heat exchanger is arranged directly downstream of the heat transfer fluid heating device.

3. The thermal management system according to claim 1, wherein, apart from the first pump, the heat transfer fluid heating device and the two-fluid heat exchanger, the first branch does not include any other device capable of modifying the amount of heat accumulated by the heat transfer fluid.

4. The thermal management system according to claim 1, wherein the second branch does not include any device capable of modifying the amount of heat accumulated by the heat transfer fluid.

5. The thermal management system according to claim 1, wherein the second branch includes a heat transfer fluid expansion vessel.

6. The thermal management system according to claim 1, wherein the first pump is arranged upstream of the heating device and in that the heat transfer fluid circuit includes a third branch which is connected to the first branch in parallel with the first pump and with the heating device, and which includes a second pump and an electric machine heat exchanger, which allows the exchange of heat between power electronics and an electric motor of the vehicle, on the one hand, and the heat transfer fluid, on the other hand, an upstream end of the third branch being connected to the second branch and a downstream end of the third branch being connected to the first branch upstream of the two-fluid heat exchanger.

7. The thermal management system according to claim 6, wherein the heat transfer fluid circuit is configured to operate in a second mode of heating the internal air flow, in which all of the heat transfer fluid passing through the second branch circulates in a closed loop through the second pump, through the electric machine heat exchanger then through the two-fluid heat exchanger before returning to the second pump via the second branch, the two-fluid heat exchanger being active.

8. The thermal management system according to claim 7, wherein the heat transfer fluid circuit is configured to operate in a third mode of heating the internal air flow, in which all of the heat transfer fluid passing through the two-fluid heat exchanger, in an active state, passes through the second branch and is then split into two flows circulating simultaneously:

through the first pump, through the electric heating device and through the two-fluid heat exchanger before returning to the second branch;

through the second pump, through the electric machine heat exchanger and through the two-fluid heat exchanger before returning to the second branch.

9. The thermal management system according to claim 6, wherein the heat transfer fluid circuit is configured to operate in a third mode of heating the internal air flow, in which all of the heat transfer fluid passing through the two-fluid heat exchanger, in an active state, passes through the second branch and is then split into two flows circulating simultaneously:

through the first pump, through the electric heating device and through the two-fluid heat exchanger before returning to the second branch;

through the second pump, through the electric machine heat exchanger and through the two-fluid heat exchanger before returning to the second branch.

10. The thermal management system according to claim 1, wherein the heat transfer fluid circuit is configured to operate in a fourth mode of heating the internal air flow, in which all of the heat transfer fluid passing through the second branch circulates in a closed loop through the first pump, through the electric heating device, through the two-fluid heat exchanger and through the battery heat exchanger before returning to the first pump via the second branch, the two-fluid heat exchanger being active and the electric heating device being inactive.

11. The thermal management system according to claim 10, wherein the heat transfer fluid circuit is configured to operate in a fourth mode of heating the internal air flow, in which all of the heat transfer fluid passing through the second branch circulates in a closed loop through the first pump, through the electric heating device, through the two-fluid heat exchanger and through the battery heat exchanger before returning to the first pump via the second branch, the two-fluid heat exchanger being active and the electric heating device being inactive, wherein the fifth branch includes an upstream end which is connected to the fourth branch downstream of the battery heat exchanger and a downstream end which is connected to the first branch upstream of the first pump.

12. The thermal management system according to claim 1, wherein the heat transfer fluid circuit includes a fifth branch equipped with a radiator arranged in an external air flow, the fifth branch being connected to the first branch in parallel with the second branch.

13. The thermal management system according to claim 12, wherein the first pump is arranged upstream of the heating device and in that the heat transfer fluid circuit includes a third branch which is connected to the first branch in parallel with the first pump and with the heating device, and which includes a second pump and an electric machine heat exchanger, which allows the exchange of heat between power electronics and an electric motor of the vehicle, on the one hand, and the heat transfer fluid, on the other hand, an upstream end of the third branch being connected to the second branch and a downstream end of the third branch being connected to the first branch upstream of the two-fluid heat exchanger, wherein the heat transfer fluid circuit includes a sixth branch which includes an upstream end which is connected to the third branch downstream of the electric machine heat exchanger and a downstream end which is connected to the fifth branch upstream of the first radiator.

14. The thermal management system according to claim 13, wherein the heat transfer fluid circuit includes a device for redirecting the heat transfer fluid which includes only three three-way valves:

a first three-way valve being arranged at a connection point connecting the first branch with the second branch and with the fourth branch;

a second three-way valve being arranged at a connection point connecting the third branch with the sixth branch;

a third three-way valve being arranged at a connection point connecting the fifth branch with the fourth branch.

15. The thermal management system according to claim 12, wherein the first pump is arranged upstream of the heating device and in that the heat transfer fluid circuit includes a third branch which is connected to the first branch in parallel with the first pump and with the heating device, and which includes a second pump and an electric machine heat exchanger, which allows the exchange of heat between power electronics and an electric motor of the vehicle, on the one hand, and the heat transfer fluid, on the other hand, an upstream end of the third branch being connected to the second branch and a downstream end of the third branch being connected to the first branch upstream of the two-fluid heat exchanger, wherein the heat transfer fluid circuit includes a sixth branch which includes an upstream end which is connected to the third branch downstream of the electric machine heat exchanger and a downstream end which is connected to the fifth branch upstream of the first radiator.

16. The thermal management system according to claim 12, wherein the fifth branch includes an upstream end which is connected to the fourth branch downstream of the battery heat exchanger and a downstream end which is connected to the first branch upstream of the first pump.

17. The thermal management system according to claim 1, wherein the first pump is arranged upstream of the heating device and in that the heat transfer fluid circuit includes a third branch which is connected to the first branch in parallel with the first pump and with the heating device, and which includes a second pump and an electric machine heat exchanger, which allows the exchange of heat between power electronics or an electric motor of the vehicle, on the one hand, and the heat transfer fluid, on the other hand, an upstream end of the third branch being connected to the second branch and a downstream end of the third branch being connected to the first branch upstream of the two-fluid heat exchanger.

18. A method of operating a thermal management system for a hybrid or electric vehicle, the thermal management system comprising:

a reversible air conditioning circuit in which a refrigerant circulates, a heat transfer fluid circuit, and a two-fluid heat exchanger arranged jointly between the reversible air conditioning circuit and the heat transfer fluid circuit, with the reversible air conditioning circuit including a condenser for transmitting heat energy to an internal air flow, and the heat transfer fluid circuit including:

a first branch having two ends and including a first pump, a heat transfer fluid heating device and the two-fluid heat exchanger, a second branch with two ends connected respectively to the ends of the first branch so that the first branch and the second branch form a closed heat transfer fluid circuit, wherein the heat transfer fluid circuit is configured such that, in a first mode of heating the internal air flow, all of the heat transfer fluid passing through the heat transfer fluid heating device then passes through the two-fluid heat exchanger before returning to the first pump via the second branch, the heat transfer fluid heating device and the two-fluid heat exchanger being active, wherein the heat transfer fluid circuit includes a fourth branch equipped with a battery heat exchanger, which is configured to allow the exchange of heat between batteries of the vehicle and the heat transfer fluid, the fourth branch including an upstream end which is connected to the first branch downstream of the two-fluid heat exchanger and a downstream end which is connected to the second branch, and wherein, in a first mode of heating the internal air flow, the method comprises passing all of the heat transfer fluid through the heating device, then directing the heat transfer fluid so that it passes through the two-fluid heat exchanger, and subsequently directing the heat transfer fluid so that it returns to the first pump via the second branch, the heating device and the two-fluid heat exchanger being active.

* * * * *